United States Patent [19]
Otway et al.

[11] 3,856,455
[45] Dec. 24, 1974

[54] METHOD AND APPARATUS FOR MIXING AND TURBULATING PARTICULATE FUEL WITH AIR FOR SUBSEQUENT COMBUSTION

[76] Inventors: Clifford G. Otway, 3023 Larchway, Port Coquitlam; Barry D. Biden, 1350 W. 70th, Vancouver, both of Canada

[22] Filed: Jan. 29, 1973

[21] Appl. No.: 327,821

[30] Foreign Application Priority Data
Feb. 1, 1972 Canada.................. 133611

[52] U.S. Cl.............. 431/11, 110/28 F, 431/10, 431/165, 431/173, 431/351
[51] Int. Cl................. F23d 11/44, F23l 15/00
[58] Field of Search............ 110/28; 431/9, 10, 11, 431/173, 161, 353, 351, 165

[56] References Cited
UNITED STATES PATENTS
1,294,730 2/1919 Von Porat.................. 110/28 R
1,354,741 10/1920 Harder...................... 110/28 R
1,777,411 10/1930 Mayr........................ 431/173

*Primary Examiner*—Edward G. Favors
*Attorney, Agent, or Firm*—Fetherstonhaugh & Co.

[57] ABSTRACT

The method disclosed includes injecting particulate fuel and a relatively small quantity of air into one end of a chamber so as to promote turbulence in the mixture during passage along the chamber to an outlet where ignition takes place. Further air is added to the mixture in the region of the outlet in sufficient quantities to permit full combustion of the entrained fuel when discharged from the outlet.

Also disclosed are three alternative forms of apparatus each including a chamber for promoting turbulence. To effect turbulation, the air and fuel inlets are positioned to provide a cyclonic movement or suitable guides may be provided within the chamber to cause such movement.

14 Claims, 7 Drawing Figures

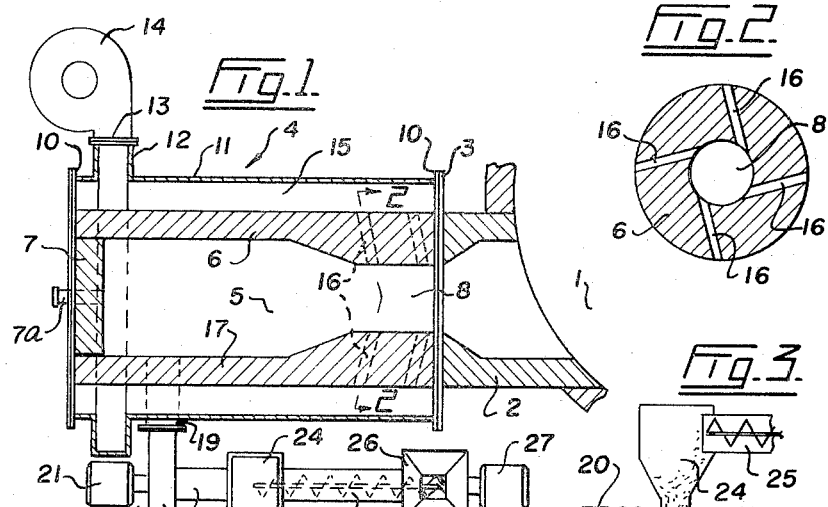
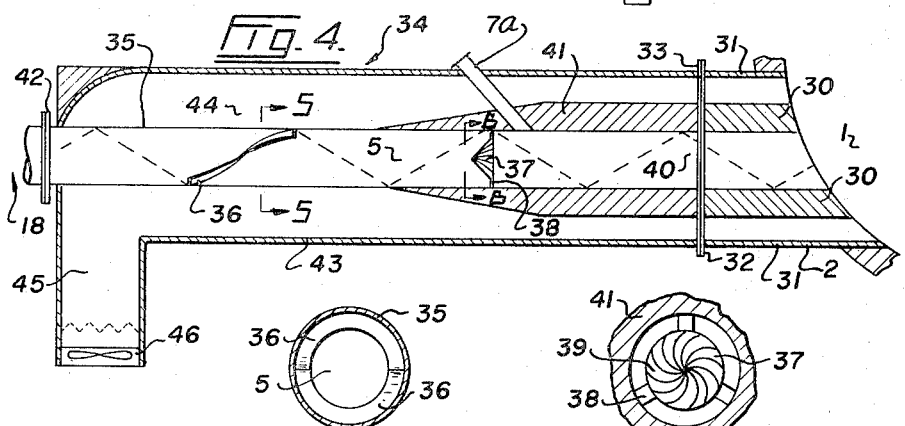
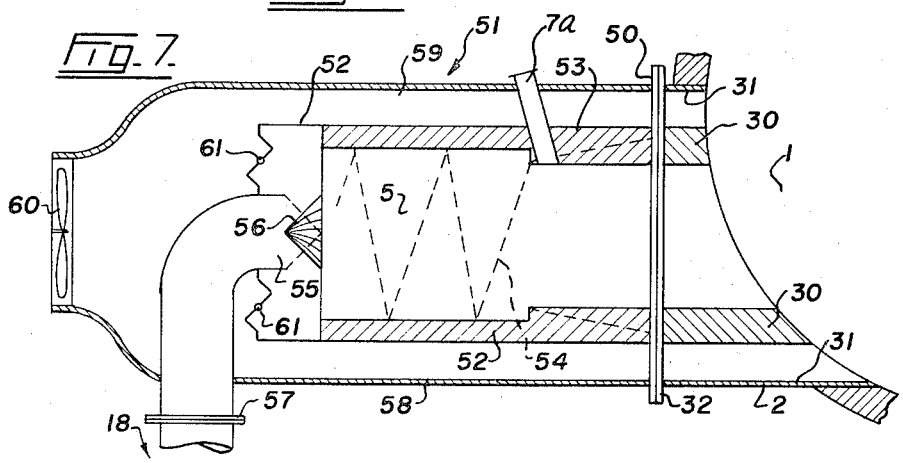

METHOD AND APPARATUS FOR MIXING AND TURBULATING PARTICULATE FUEL WITH AIR FOR SUBSEQUENT COMBUSTION

The invention relates to a method and apparatus for promoting turbulence in a mixture of particulate fuel and air for subsequent combustion in a furnace.

U.S. Pat. No. 3,589,315 to Wilbur E. Hart discloses an apparatus for igniting and burning air borne particulate combustible material. In the arrangement disclosed in the above numbered patent, the particulate material is fed tangentially in to a cylindrical chamber entrained in air so as to follow a generally cyclonic path. Secondary air is simultaneously admitted through the end wall of the chamber where ignition of the mixture is also effected. Combustion of the fuel then takes place along the length of the chamber and is completed in the furnace to which the chamber is connected at the other end.

In practice, it has been found that the high temperatures which occur within the combustion chamber produce a rapid physical breakdown in the structure and the use of the arrangement disclosed in U.S. Pat. No. 3,589,315 has not therefore proved practical.

It is among the objects of the present invention to provide a method and apparatus for generating an intimate mixture of air and particulate fuel to permit subsequent combustion in a furnace to a degree comparable with that achieved by the above mentioned apparatus whilst avoiding the corresponding disadvantages.

In one aspect therefore the invention provides a method of generating a fuel mixture stream comprised of an intimate mixture of air and particulate fuel, comprising the steps of injecting particulate fuel and a first air stream into one end of a chamber having an outlet at the other end for connection to a furnace and so as to generate a turbulent suspension of fuel in air as a stream moving towards the outlet, the first air stream/fuel proportions and the temperature of the chamber being insufficient to permit significant combustion of the fuel during passage along the chamber, and providing a second quantity of air in the region of said outlet, which, together with the first quantity of air, is at least sufficient to permit complete combustion of the fuel in suspension when discharged into a furnace.

In another aspect, the invention provides apparatus for generating a fuel mixture stream comprised of an intimate mixture of air and particulate fuel, comprising a longitudinal chamber having an inlet at one end and an outlet at the other end, means connected to the inlet of the chamber for entraining particulate fuel in a first air stream in proportion insufficient to permit significant combustion of the fuel, and for injecting the resultant mixture in the chamber so as to produce a turbulent fuel in air suspension as a stream moving towards the outlet, and means for directing a second air stream into confluence with the turbulent suspension in the region of said outlet to provide, together with the air derived from the first air stream, at least sufficient air to permit complete combustion of the fuel in suspension when discharged through the outlet.

The invention will now be further described with reference to the accompanying drawings in which FIG. 1 is a plan view, partially in section, of an apparatus according to the invention connected to a furnace, FIGS. 2 and 3 are sectional details on the lines 2—2 and 3—3 respectively of FIG. 1, FIG. 4 is a sectional plan view of a second form of apparatus according to the invention connected to a furnace, FIGS. 5 and 6 are sectional details or the lines 5—5 and 6—6 respectively of FIG. 4 and, FIG. 7 is a sectional plan view of a third form of apparatus according to the invention.

Referring first to FIGS. 1 to 3, the arrangement shown comprises a furnace 1 having a tuyere 2 connected through a flange connection 3 to a fuel mixture turbulator 4 constructed in accordance with the invention. The tuyere 2 is formed of fire resisting brick as an integral part of the furnace 1.

The turbulator 4 comprises a cylindrical turbulating chamber 5 defined by walls 6, the chamber 5 being closed at one end 7 and extending forwardly to an ignition zone at an outlet 8 at the other end. The outlet 8 opens into the tuyere 2. The walls 6 and 7 may be of fire brick, as shown, or of other material, since they are not subjected to excessive temperatures. At the outlet 8, the walls 6 converge so that the ignition zone is of reduced diameter.

At each end, the walls 6 carry flanges 10 between which a cylindrical steel casing 11 is supported. Near the rear end of the casing 11, an annular projecting portion 12 is provided having a flanged inlet 13 to which a fan 14 is connected. The casing 11 defines an annular chamber 15 surrounding the walls 6, the annular chamber 15 being connected to the ignition zone at the outlet 8 through channels 16 in the walls 6. The channels 16 are set at an angle to the axis of the chamber 5 as seen in FIG. 1 and also at an angle to the radius as seen in FIG. 2. This configuration promotes a cyclonic movement of the fuel in air suspension along the chamber during and after ignition. At the rear end of the chamber 5, a gas pilot 7a is provided for starting purposes. A tangential inlet 17 is also provided for the introduction of air and fuel. Solid particulate fuel, for example shredded or powdered bark and other wood residue, is fed into the chamber 5 through inlet 17 by a supply assembly 18. The supply assembly includes a duct 19 connected between the inlet 17 and a blower 20 driven by a motor 21. The blower 20 has an inlet duct 22 drawing in air through an end 23 (see FIG. 3). This air may either be ambient or preheated, for example by admixture with flue gases from the furnace being fired. Also fed into the inlet duct 22 is particulate wood residue from a hopper 24 so that the particulate material is entrained in the air drawn in.

The hopper 24 is supplied with the particulate fuel by a screw conveyor 25 at a rate to achieve proper proportioning between this primary air and the fuel in the suspension to be achieved in the chamber 5. The screw conveyor 25 is in turn fed from a hopper 26 which receives conditioned fuel from a fuel stack (not shown). The screw conveyor 25 is driven by a motor 27. The proportions of air and fuel fed in through the inlet 17 to the chamber 5 are maintained so as to achieve as high a proportion as possible of fuel in relation to primary air whilst maintaining the cyclonic suspension within the chamber and without being sufficient to combustion therein.

In operation, the blowers 14 and 20 and the conveyor 25 are started up. This results in a combined fuel and primary air mixture being fed tangentially into the chamber 5 through the inlet 17 to produce a cyclonically moving suspension and also generates a flow of secondary air along the annular chamber 15 outside of chamber 5. The gas pilot 7a is also lit to provide slight initial combustion in the chamber 5. As the cyclonic suspension reaches the ignition zone at the outlet 8, it is accelerated both cyclonically and axially by air injected through the channels 16 and full ignition takes place due to the additional oxygen provided. There is a very thorough mixing of primary air and the particulate fuel before full burning takes place at or beyond outlet 8. The injected secondary air is sufficient both to drive the now diluted suspension through the tuyere 2 into the furnace 1 and to provide sufficient additional oxygen to ensure complete combustion of the suspended fuel particles in the furnace. When combustion has continued sufficiently long for the wall portions defining the ignition zone to have become heated, the pilot 7a is turned off. The initial ignition is then sustained by radiant heat from the walls.

FIG. 4 shows a second embodiment of the invention in which the furnace 1 has a tuyere 2 as before but in this case the tuyere is formed with an inner wall 30 and an outer wall 31. The inner wall 30 is supported from the wall of the furnace 1 by supports (not shown) in a conventional manner and the outer end of the tuyere is provided with a flange 32.

Connected to the flange 32 is the flange 33 of a turbulator assembly 34. The assembly 34 comprises a central tube 35 defining the turbulation chamber 5 at the rear end and including internally a pair of helically extending guide ribs 36. A conical guide 37 may also be located within the chamber 5 by means of supports 38 (see FIG. 6). The guide 37 is formed with spiral grooves 39 on the surface thereof to assist in promoting cyclonic movement in a fuel and air suspension passing along the tube. Towards the outlet end 40 of the tube 35 the walls of the tube are formed from heat resisting brick as at 41 to form an ignition zone for the mixture received from the chamber 5. A gas pilot 7a projects into the ignition zone through the walls thereof. At the rear end, the tube 35 is flanged at 42 for connection to a feed assembly 18 which is identical to that described with respect to FIG. 1. A casing 43 surrounds the tube 35 so as to define an annular chamber 44 which connects with the annular passage formed by the wall 31 around the walls 30 of the tuyere. The casing 43 has an inlet duct 45 in which a blower 46 is located.

In operation, the mixture of particulate fuel and primary air is fed in through the flange connection 42 from the feed assembly 18 with the blower 46 in operation and the pilot 7a lit. The helical guides 36 and conical guide 37 impart a cyclonic movement to the mixture so as to maintain the particulate fuel in suspension along the tube 35 and into the ignition zone to provide primary combustion. Secondary air supplied by the blower 46 passes along the passage 44 and directly into the furnace in confluence with the suspension passing along the tube. The secondary air to permit complete combustion of the particulate fuel is thus added to the suspension within the furnace itself. After combustion has continued for a sufficient time for the walls 41 to have become heated, the pilot 7a is turned off and combustion becomes self sustaining.

Turning now to the embodiments of FIG. 7, the furnace 1 has a tuyere 2 provided with inner and outer walls 30 and 31 in the same manner as in the embodiment of FIG. 4. A flange 32 is connected to a flange 50 of a turbulator 51. The turbulator 51 comprises a tubular structure 52 having a sheet metal or brick rear portion defining a turbulating chamber 5. At the forward end 53 a fire brick ignition zone is formed. A gas pilot 7a projects through the walls 53 into the ignition zone. The chamber 5 is provided with a helical gas guide, shown diagrammatically at 54, which is similar in construction to the guide 36 of FIG. 4. An inlet duct 55 extends axially into the centre of the tubular structure 52 for the introduction of particulate fuel and primary air. At the end of the duct, a conical guide 56 is provided, the guide 56 being constructed and supported in an identical manner to the guide 37 of FIG. 4. The inlet duct 55 extends out at right angles to the axis of the tubular structure 52 and is flanged at 57 for connection to a feed assembly 18 of the kind described and shown in FIG. 1.

A tubular casing 58 surrounds the tubular structure 52 so as to define an annular chamber 59 connected directly through the flanges 50 and 32 to the annular passage defined by the walls 31 and 30 of the tuyere. At the rear end, the casing 58 is provided with a blower 60. The rear end of the tubular structure 52 is closed and is provided with adjustable baffles 61 whereby air can if necessary be introduced into the tubular structure 52 from the chamber 59.

In operation, a primary air and fuel mixture is introduced into the duct 55 from an assembly 18 through the flange connecting 57 with the pilot 7a lit. Within the tubular structure 52, turbulence is promoted in the chamber 5 by the guides 56 and 54 so that a cyclonic fuel in air suspension passes into the ignition zone where initial combustion takes place. The necessary secondary air for full combustion is driven by the fan 60 along the annular chamber 59 and the tuyere 2 into the furnace 1. Thus the mixture necessary for full combustion of the particulate fuel occurs within the furnace 1 itself. When combustion has become fully established so that the fire brick walls 41 and 30 have become heated, the pilot 7a is turned off. Ignition then becomes self sustaining.

In all of the above described embodiments, both the primary air premixed with the fuel and the secondary air may be preheated, for example by admixture with flue gases from the furnace to which the suspension is being supplied for combustion. The preheating of the air mixed with the fuel will be regulated to maintain the suspension temperature below the fuel ignition temperature. For wood dust fuel the suspension will preferably be maintained below 1,000°F, the ignition temperature of the fuel being approximately 1,400°F to 1,600°F.

We claim:

1. Apparatus for generating and igniting a fuel mixture stream comprised of an intimate mixture of air and particulate fuel, comprising
   an elongated chamber having an inlet at one end and a restricted outlet at the other end,
   a duct connected axially to the inlet of the chamber for entraining particulate fuel in a stream of primary air in a proportion and at a temperature insufficient to permit significant combustion of the fuel in the chamber, and for injecting the resultant mixture into the chamber, said chamber being constructed to exclude any other air therefrom,
   means in said duct for generating turbulence in the chamber to create a thorough mixing of the fuel and primary air therein as the mixture moves therethrough towards the outlet, means for maintaining ignition of the suspension in the region of the outlet, and means for directing a stream of secondary air into confluence with the turbulent suspension in the region of said outlet to provide, together with the primary air sufficient air to support complete combustion of the fuel suspended in the air, said directing means being such as to cause the secondary air to assist in moving said mixture through the chamber.

2. Apparatus as claimed in claim 1, wherein the means for generating turbulence comprises a helical guide disposed in said duct.

3. Apparatus as claimed in claim 1, wherein the means for generating turbulence comprises a conical deflector disposed at the discharge end of the duct.

4. Apparatus as claimed in claim 3, wherein the conical deflector has a fluted surface having a substantially spiral configuration for imparting a cyclonic movement to the fuel in air mixture.

5. A method of generating a fuel mixture stream comprised of an intimate mixture of air and particulate fuel, comprising the steps of:

entraining particulate fuel in a small amount of primary air in a premixing step and injecting the resultant mixture into one end of an elongated chamber having a restricted outlet near its opposite end for connection to a furnace and to the exclusion of other air from the chamber, the amount of said primary air being insufficient to permit significant combustion of the fuel in the chamber, generating turbulence in the chamber to create a thorough mixing of the fuel and primary air in the chamber as the mixture moves therethrough towards the outlet, and igniting said mixture in the region of said outlet and injecting secondary air into the mixture adjacent the outlet to create together with the primary air complete combustion of the fuel in suspension in the air, said secondary air being so injected as to assist in moving said mixture through the chamber.

6. A method as claimed in claim 5, wherein the resultant mixture is injected into the chamber substantially tangentially so as to effect a cyclonic movement of the mixture along the chamber.

7. A method as claimed in claim 5, wherein the primary air is preheated.

8. A method as claimed in claim 5, wherein the secondary air is preheated.

9. A method as claimed in claim 8 wherein the air is preheated by admixture with flue gases from a furnace to which the fuel mixture stream is being supplied for combustion.

10. A method of generating a fuel mixture stream comprised of an intimate mixture of air and particulate fuel, comprising the steps of:

preheating primary air by admixture with flue gases from a furnace to which the fuel mixture stream is being supplied, injecting particulate fuel and a small amount of said primary air into one end of an elongated chamber having a restricted outlet near its opposite end for connection to a furnace and to the exclusion of other air from the chamber, the amount of said primary air being insufficient to permit significant combustion of the fuel in the chamber, generating turbulence in the chamber to create a thorough mixing of the fuel and primary air in the chamber as the mixture moves therethrough towards the outlet, and igniting said mixture in the region of said outlet and injecting secondary air into the mixture adjacent the outlet to create together with the primary air complete combustion of the fuel in suspension in the air, said secondary air being so injected as to assist in moving said mixture through the chamber.

11. Apparatus for generating and igniting a fuel mixture stream comprised of an intimate mixture of air and particulate fuel, comprising an elongated chamber having an inlet at one end and a restricted outlet at the other end, means for directing a small stream of preheated primary air into said inlet, means for entraining particulate fuel into the stream of primary air to premix the fuel and air before being injected into the chamber, the proportion of fuel to air and the temperature thereof being insufficient to permit significant combustion of the fuel in the chamber, said chamber being constructed to exclude any other air therefrom, means for generating turbulence in the chamber to crease a thorough mixing of the fuel and primary air therein as the mixture moves therethrough towards the outlet, means for maintaining ignition of the suspension in the region of the outlet, and means for directing a stream of secondary air into confluence with the turbulent suspension in the region of said outlet to provide, together with the primary air sufficient air to support complete combustion of the fuel suspended in the air, said directing means being such as to cause the secondary air to assist in moving said mixture through the chamber.

12. Apparatus as claimed in claim 11, wherein the means for generating turbulence comprises a helical guide disposed in said duct.

13. Apparatus as claimed in claim 11, wherein the means for generating turbulence comprises a conical deflector disposed at the discharge end of the duct.

14. Apparatus as claimed in claim 13, wherein the conical deflector has a fluted surface having a substantially spiral configuration for imparting a cyclonic movement to the fuel in air mixture.

* * * * *